(12) United States Patent
Vinberg (10) Patent No.: US 7,315,893 B2
(45) Date of Patent: Jan. 1, 2008

(54) METHOD AND APPARATUS FOR FILTERING MESSAGES BASED ON CONTEXT

(75) Inventor: Anders Vinberg, Plandome Manor, NY (US)

(73) Assignee: Computer Associates Think, Inc., Islandia, NY (US)

( * ) Notice: Subject to any disclaimer, the term of this patent is extended or adjusted under 35 U.S.C. 154(b) by 468 days.

(21) Appl. No.: 10/091,070

(22) Filed: Mar. 4, 2002

(65) Prior Publication Data

US 2003/0023722 A1    Jan. 30, 2003

Related U.S. Application Data

(63) Continuation-in-part of application No. 09/949,101, filed on Sep. 7, 2001, which is a continuation of application No. 09/408,213, filed on Sep. 27, 1999, now Pat. No. 6,289,380, which is a continuation of application No. 08/892,919, filed on Jul. 15, 1997, now Pat. No. 5,958,012.

(60) Provisional application No. 60/273,044, filed on Mar. 2, 2001.

(51) Int. Cl.
  *G06F 15/173*  (2006.01)
(52) U.S. Cl. ...................... 709/224; 709/246
(58) Field of Classification Search ................ 707/10; 709/223–224; 714/4, 796
  See application file for complete search history.

(56) References Cited

U.S. PATENT DOCUMENTS

| | | | |
|---|---|---|---|
| 2,485,343 A | 10/1949 | Zuschlag | 177/351 |
| 3,599,033 A | 8/1971 | Stettiner et al. | 315/18 |
| 4,464,543 A | 8/1984 | Kline et al. | 379/224 |
| 4,626,892 A | 12/1986 | Nortrup et al. | 348/569 |
| 4,665,494 A | 5/1987 | Tanaka et al. | 702/77 |
| 4,881,197 A | 11/1989 | Fischer | 715/530 |
| 4,937,037 A | 6/1990 | Griffiths et al. | 345/36 |
| 4,965,752 A | 10/1990 | Keith | 345/427 |
| 4,977,390 A | 12/1990 | Saylor et al. | 340/521 |
| 5,233,687 A | 8/1993 | Henderson, Jr. et al. | 715/804 |
| 5,261,044 A | 11/1993 | Dev et al. | 715/855 |
| 5,271,058 A | 12/1993 | Andrews et al. | 379/265.11 |
| 5,271,063 A | 12/1993 | d'Alayer de Costemore d'Arc | 381/104 |
| 5,295,244 A | 3/1994 | Dev et al. | 715/853 |

(Continued)

FOREIGN PATENT DOCUMENTS

EP    0 547 993 A2    6/1993

(Continued)

OTHER PUBLICATIONS

Dupuy et al., *Netmate: A Network Management Environment*, IEEE Network Magazine, pp. 35-43, Mar. 1991.

(Continued)

*Primary Examiner*—Patrice L. Winder
(74) *Attorney, Agent, or Firm*—Baker Botts L.L.P.

(57) ABSTRACT

A method for reporting alert conditions is disclosed which includes defining alert filter criteria, identifying an alert condition, analyzing one or more properties of the alert condition based on the alert filter criteria, and determining whether to report the alert condition. Systems and computer-readable storage media for reporting an alert condition are also disclosed.

19 Claims, 7 Drawing Sheets

U.S. PATENT DOCUMENTS

| | | | |
|---|---|---|---|
| 5,303,388 A | 4/1994 | Kreitman et al. | 715/836 |
| 5,353,399 A | 10/1994 | Kuwamoto et al. | 715/736 |
| 5,367,670 A | 11/1994 | Ward et al. | 714/47 |
| 5,394,522 A | 2/1995 | Sanchez-Frank et al. | 715/735 |
| 5,408,218 A | 4/1995 | Svedberg et al. | 340/507 |
| 5,440,688 A | 8/1995 | Nishida | 714/4 |
| 5,444,849 A | 8/1995 | Farrand et al. | 709/237 |
| 5,483,631 A | 1/1996 | Nagai et al. | 715/736 |
| 5,486,457 A | 1/1996 | Butler et al. | 435/7.2 |
| 5,495,607 A | 2/1996 | Pisello et al. | 395/600 |
| 5,500,934 A | 3/1996 | Austin et al. | 715/853 |
| 5,504,921 A | 4/1996 | Dev et al. | 395/800 |
| 5,509,123 A | 4/1996 | Dobbins et al. | 709/243 |
| 5,535,403 A | 7/1996 | Li et al. | 715/853 |
| 5,586,254 A | 12/1996 | Kondo et al. | 714/25 |
| 5,586,255 A | 12/1996 | Tanaka et al. | 709/223 |
| 5,631,825 A | 5/1997 | van Weele et al. | 700/83 |
| 5,634,122 A | 5/1997 | Loucks et al. | 707/8 |
| 5,650,814 A | 7/1997 | Florent et al. | 348/39 |
| 5,655,081 A * | 8/1997 | Bonnell et al. | 709/223 |
| 5,666,477 A | 9/1997 | Maeda | 345/440 |
| 5,671,381 A | 9/1997 | Strasnick et al. | 715/848 |
| 5,682,487 A | 10/1997 | Thomson | 715/800 |
| 5,684,967 A | 11/1997 | McKenna et al. | 715/853 |
| 5,696,486 A | 12/1997 | Poliquin et al. | 340/506 |
| 5,696,892 A | 12/1997 | Redmann et al. | 395/125 |
| 5,699,403 A * | 12/1997 | Ronnen | 714/48 |
| 5,745,692 A | 4/1998 | Lohmann, II et al. | 395/200.53 |
| 5,748,098 A | 5/1998 | Grace | 370/242 |
| 5,748,884 A | 5/1998 | Royce et al. | 714/57 |
| 5,751,965 A | 5/1998 | Mayo et al. | 709/224 |
| 5,761,502 A | 6/1998 | Jacobs | 707/103 R |
| 5,768,501 A | 6/1998 | Lewis | 714/48 |
| 5,774,669 A | 6/1998 | George et al. | 709/224 |
| 5,787,252 A | 7/1998 | Schettler et al. | 709/224 |
| 5,793,974 A | 8/1998 | Messinger | 709/224 |
| 5,796,951 A | 8/1998 | Hamner et al. | 709/223 |
| 5,801,707 A | 9/1998 | Rolnik et al. | 715/853 |
| 5,802,383 A | 9/1998 | Li et al. | 345/420 |
| 5,805,819 A | 9/1998 | Chin et al. | 709/224 |
| 5,809,265 A | 9/1998 | Blair et al. | 715/764 |
| 5,812,750 A | 9/1998 | Dev et al. | 714/4 |
| 5,832,503 A | 11/1998 | Malik et al. | 709/223 |
| 5,857,190 A * | 1/1999 | Brown | 707/10 |
| 5,867,650 A | 2/1999 | Osterman | 709/203 |
| 5,872,911 A * | 2/1999 | Berg | 714/43 |
| 5,933,601 A | 8/1999 | Fanshier et al. | 709/223 |
| 5,941,996 A * | 8/1999 | Smith et al. | 714/47 |
| 5,948,060 A | 9/1999 | Gregg et al. | 709/212 |
| 5,956,028 A | 9/1999 | Matsui et al. | 715/757 |
| 5,958,012 A | 9/1999 | Battat et al. | 709/224 |
| 5,963,886 A | 10/1999 | Candy et al. | 702/61 |
| 5,987,376 A | 11/1999 | Olson et al. | 701/201 |
| 5,991,771 A | 11/1999 | Falls et al. | 707/202 |
| 6,000,045 A * | 12/1999 | Lewis | 709/223 |
| 6,008,820 A | 12/1999 | Chauvin et al. | 345/502 |
| 6,011,838 A | 1/2000 | Cox | 379/112.06 |
| 6,012,984 A | 1/2000 | Roseman | 463/42 |
| 6,021,262 A | 2/2000 | Cote et al. | 714/48 |
| 6,029,177 A | 2/2000 | Sadiq et al. | 707/201 |
| 6,035,324 A | 3/2000 | Chang et al. | 709/203 |
| 6,049,828 A | 4/2000 | Dev et al. | 709/224 |
| 6,052,722 A | 4/2000 | Taghadoss | 709/223 |
| 6,057,757 A * | 5/2000 | Arrowsmith et al. | 709/224 |
| 6,058,494 A | 5/2000 | Gold et al. | 714/42 |
| 6,061,714 A | 5/2000 | Housel, III et al. | 709/203 |
| 6,070,184 A | 5/2000 | Blount et al. | 709/200 |
| 6,073,099 A | 6/2000 | Sabourin et al. | 704/256.6 |
| 6,085,256 A | 7/2000 | Kitano et al. | 719/315 |
| 6,094,195 A | 7/2000 | Clark et al. | 715/839 |
| 6,108,782 A | 8/2000 | Fletcher et al. | 713/153 |
| 6,112,015 A | 8/2000 | Planas et al. | 709/223 |
| 6,125,390 A | 9/2000 | Touboul | 709/223 |
| 6,131,118 A * | 10/2000 | Stupek et al. | 709/223 |
| 6,141,777 A | 10/2000 | Cutrell et al. | 714/47 |
| 6,154,212 A | 11/2000 | Eick et al. | 715/848 |
| 6,154,849 A * | 11/2000 | Xia | 714/4 |
| 6,161,082 A | 12/2000 | Goldberg et al. | 704/3 |
| 6,167,448 A | 12/2000 | Hemphill et al. | 709/224 |
| 6,185,613 B1 | 2/2001 | Lawson et al. | 709/224 |
| 6,192,365 B1 | 2/2001 | Draper et al. | 707/101 |
| 6,202,085 B1 | 3/2001 | Benson et al. | 709/205 |
| 6,209,033 B1 | 3/2001 | Datta et al. | 709/224 |
| 6,222,547 B1 | 4/2001 | Schwuttke et al. | 345/419 |
| 6,237,006 B1 | 5/2001 | Weinberg et al. | 707/103 R |
| 6,260,158 B1 | 7/2001 | Purcell et al. | 714/10 |
| 6,271,845 B1 | 8/2001 | Richardson | 715/764 |
| 6,288,650 B2 | 9/2001 | Chavand | 340/679 |
| 6,298,378 B1 * | 10/2001 | Angal et al. | 709/223 |
| 6,366,284 B1 | 4/2002 | McDonald | 345/440 |
| 6,373,505 B1 | 4/2002 | Bellamy et al. | 715/772 |
| 6,374,293 B1 | 4/2002 | Dev et al. | 709/220 |
| 6,404,444 B1 | 6/2002 | Johnston et al. | 715/839 |
| 6,421,707 B1 | 7/2002 | Miller et al. | 709/206 |
| 6,456,306 B1 | 9/2002 | Chin et al. | 715/810 |
| 6,546,425 B1 | 4/2003 | Hanson et al. | 709/227 |
| 6,577,323 B1 | 6/2003 | Jamieson et al. | 715/700 |
| 6,587,108 B1 | 7/2003 | Guerlain et al. | 345/440 |
| 6,603,396 B2 | 8/2003 | Lewis et al. | 340/506 |
| 6,614,433 B1 | 9/2003 | Watts | 345/440 |
| 6,639,614 B1 | 10/2003 | Kosslyn et al. | 715/837 |
| 6,661,434 B1 | 12/2003 | MacPhail | 715/772 |
| 6,704,874 B1 * | 3/2004 | Porras et al. | 709/224 |
| 6,707,795 B1 * | 3/2004 | Noorhosseini et al. | 714/796 |
| 6,711,154 B1 | 3/2004 | O'Neal | 370/352 |
| 6,732,170 B2 | 5/2004 | Miyake et al. | 709/223 |
| 6,738,809 B1 | 5/2004 | Brisebois et al. | 709/224 |
| 6,744,446 B1 | 6/2004 | Bass et al. | 715/734 |
| 2001/0042118 A1 | 11/2001 | Miyake et al. | 709/223 |
| 2001/0044840 A1 | 11/2001 | Carleton | 709/223 |
| 2003/0046390 A1 | 3/2003 | Ball et al. | 709/224 |
| 2003/0069952 A1 | 4/2003 | Tams et al. | 709/223 |
| 2004/0210469 A1 | 10/2004 | Jones et al. | 705/8 |
| 2005/0078692 A1 | 4/2005 | Gregson | 370/401 |

FOREIGN PATENT DOCUMENTS

| | | |
|---|---|---|
| EP | 0 936 597 A1 | 8/1999 |
| WO | WO95/27249 | 10/1995 |
| WO | WO 97/04389 | 2/1997 |
| WO | WO99/15950 | 4/1999 |

OTHER PUBLICATIONS

Lazar, et al., Exploiting Virtual Reality for Network Management, Singapore ICCS/ISITA, IEEE, pp. 979-983, 1992.
Feiner, et al., A virtual World for Network Management, Proc. VRAIS '93, Seattle, WA, IEEE, pp. 55-61, Oct. 18-22, 1993.
Crutcher, et al., Management and Control for Giant Gigabit Networks, IEEE Network, pp. 62-71, Nov. 1993.
Crutcher, et al., Managing Networks Through a Virtual World, IEEE Parallel & Distributed Technology, pp. 4-13, 1995.
Stafford, J., Client-Server's Missing Link (Applications Management), VARbusiness, vol. 12, No. 2, pp. 133-138, Feb. 1, 1996.
Chan, et al., A Platform for Real-Time Visualization and Interactive Simulation of Large Multimedia Networks, Proceedings of the 4th IEEE International Workshop on Parallel and Distributed Real-Time Systems, pp. 1-7, Apr. 1996.
Lamm, et al., Real-Time Geographic Visualization of World Wide Web Traffic, Fifth International World Wide Web Conference, pp. 1-17, May 6-10, 1996.
Microsoft Press Computer Dictionary, p. 92, 1997.
Computer Dictionary, 3rd ed., Microsoft Press, p. 359, 1997.

Computer Associates, Unicenter Console Management for Open VMS, Enterprise Management, 7 pages, 2002.

European Patent Office Communication for Application No. 02713722.3—2205, 5 pages, Jun. 16, 2006.

European Patent Office Communication Pursuant to Article 96(2) EPC for Application No. 02 715 024.2—1225, 8 pages, Jun. 27, 2006.

European Patent Office Communication pursuant to Article 96(2) EPC for Application No. 02 706 491.4—1225, 5 pages, Oct. 23, 2006.

Examiner's Fisrt Report on Patent Application No. 2005000029; Ref. COOP0PAU00868; 2 pages.

USPTO, Office Action Summary; U.S. Appl. No. 09/949,101; 19 pages.

USPTO, Office Action Summary; U.S. Appl. No. 10/981,067; 18 pages.

Examiner's First Report on Patent Application No. 2002240575 by Computer Assocaites Thin, Inc.; 2 pages.

PCT International Preliminary Examination Report; International Application No. PCT/US02/06444; 5 pages.

EPO Communication Pursuant to Article 96(2) EPC; Application No. 01 983 162.7 - 2224; 5 pages.

* cited by examiner

System Objects

| Component:<br>Network Server A | Importance:<br>Mission Critical | Associated Group(s):<br>AP, AR, HR, IT | ... |
|---|---|---|---|
| 305 | | | |

| Component:<br>Router A | Importance:<br>Low | Associated Group(s):<br>HR | Dependency:<br>Network Server A | ... |
|---|---|---|---|---|
| 307 | | | | |

| Component:<br>Router B | Importance:<br>Mission Critical | Associated Group(s):<br>AP, AR | Dependency:<br>Network Server A | ... |
|---|---|---|---|---|
| 309 | | | | |

| Component:<br>Workstation A | Importance:<br>Moderate | Associated Group(s):<br>AP | Dependency:<br>Router B | ... |
|---|---|---|---|---|
| 311 | | | | |

| Component:<br>Workstation B | Importance:<br>Mission Critical | Associated Group(s):<br>AR | Dependency:<br>Router B | ... |
|---|---|---|---|---|
| 313 | | | | |

| Component:<br>Application A | Importance:<br>Low | Associated Group(s):<br>AR | Dependency:<br>Workstation B | ... |
|---|---|---|---|---|
| 315 | | | | |

| Component:<br>Application B | Importance:<br>Mission Critical | Associated Group(s):<br>AR | Dependency:<br>Workstation B | ... |
|---|---|---|---|---|
| 317 | | | | |

| Component:<br>WSB Printer | Importance:<br>Mission Critical | Associated Group(s):<br>AR | Supporting:<br>Application B | ... |
|---|---|---|---|---|
| 319 | | | | |

Figure 3A

Alert filter criteria objects

| Group: AR | Report on: Mission critical importance |
|---|---|

321

| Group: HR | Report on: Medium importance or higher |
|---|---|

323

| Group: AP | Report on: Alerts with urgency within 24 hours or mission critical importance |
|---|---|

Alert condition objects

| | Component | Importance | Severity | Risk | Urgency | Group(s) |
|---|---|---|---|---|---|---|
| 331 Alert: Disk Above Threshold | Network Server A | Mission Critical | Moderate | Absolute | Immediate | AP, AR, HR, IT |
| 333 Alert: Paper Shortage | WSB Printer | Mission Critical | High | 80% | 24 Hours | AR |
| 335 Alert: Scheduled Maintenance | Router A | Low | Low | Absolute | 1 Week | HR |
| 337 Alert: File Not Found | Application A | Low | High | Absolute | Immediate | AR |
| 339 Alert: Memory shortage | Network Server A | Mission Critical | High | Absolute | Immediate | AP, AR, HR, IT |
| 341 Alert: Disk full | Workstation A | Moderate | High | Absolute | Immediate | AP |

METHOD AND APPARATUS FOR FILTERING MESSAGES BASED ON CONTEXT

RELATED APPLICATIONS

This application is a Continuation-In-Part of U.S. Ser. No. 09/949,101 filed Sep. 7, 2001, which is a Continuation of U.S. Ser. No. 09/408,213 filed Sep. 27, 1999 now U.S. Pat. No. 6,289,380 issued Sep. 11, 2001, which is a Continuation of U.S. Ser. No. 08/892,919 filed Jul. 15, 1997 now U.S. Pat. No. 5,958,012 issued Sep. 28, 1999. This application claims priority to U.S. Provisional Application Ser. No. 60/273,044 filed Mar. 2, 2001. The present application incorporates each related application by reference in its entirety.

TECHNICAL FIELD

The present application generally relates to the field of monitoring and managing ongoing processes. More specifically, the present application relates to systems and methods for generating alert and diagnostic messages for the attention of human operators.

BACKGROUND

Systems that manage computer or network systems, or other systems with embedded computer technology, commonly monitor various system parameters for the purpose of detecting problems and alerting a human to the problem. Various techniques can be employed to monitor ongoing processes. The monitored values can be analyzed in various ways, including comparison with thresholds, correlation of several values, and correlation of values over time to discover problems, unprecedented situations, or other events.

Some systems use various techniques to predict events before they occur. One such system is described in commonly owned U.S. Patent No. 6,327,550, which is incorporated herein in its entirety by reference. In such systems one response to the discovery or prediction is to bring the event to the attention of a human operator. For example, these management systems can issue a text message alert and different techniques may be employed for presenting this text message to the operator, such as a Windows dialog box, monitoring consoles, event logs, email messages, or pager messages. The alert can also be provided as an audio message through loudspeakers, headsets, or a telephone. An example of a system that provides audio alert messaging is described in commonly owned, concurrently filed, co-pending U.S. Utility Application No. 10/091,067, entitled "Method and Apparatus for Generating and Recognizing Speech as a User Interface Element in Systems and Network Management", the entirety of which is incorporated herein by reference. Commonly owned, concurrently filed, co-pending U.S. Utility Application No. 10/091,065. entitled "Method and Apparatus for Generating Context-Descriptive Messages", is also incorporated by reference in its entirety.

In large management systems with many managed components and/or networks and a high level of activity, the management systems may generate a large number of alert messages. Some alert messages may be more important than others, but are typically issued because the alert functionality of such management systems is not open to modification. Other messages may be redundant because several management systems may independently detect the consequences of an event. As a result, current management systems include various techniques for filtering such alert messages based on various rules unrelated to the content of the message.

For example, some conventional management systems designate the severity of a detected or predicted event as the filtering rule. This permits the management system to present only critical messages, or messages about events above a certain level of severity. Other systems correlate alert messages over time or over several objects as a filtering rule. This permits the recognition that a message may indicate a critical problem, even though it may not indicate such criticality by itself, e.g., a minor error may be more critical if it occurs several times in a short time period.

Even after messages have been filtered so only meaningful messages remain, individual users may be interested in different categories of messages. Some management systems include various techniques for filtering alert messages presented to particular individuals, such as messages related to one or more groups of managed components or networks that denote some sort of business process. An example of such a management system is described in commonly owned U.S. Pat. No. 5,958,012, which is incorporated herein in its entirety by reference.

SUMMARY

The present disclosure provides management systems and methods with improved alert messaging. The present disclosure also provides alert systems and methods capable of filtering alert messages generated by management systems to report operator desired messages. According to one embodiment, a method for reporting an alert condition is disclosed which includes defining alert filter criteria, identifying an alert condition and analyzing one or more properties of the alert condition and the alert filter criteria to determine whether or not to report the alert condition. The method further includes reporting the alert condition if the determination is to report the alert condition.

According to another embodiment, a system for reporting an alert condition is disclosed. The system includes a filter criteria maintenance module capable of maintaining filter alert criteria, an alert condition detector capable of identifying one or more alert conditions, an alert condition filter capable of filtering identified alert conditions based on the alert filter criteria, and an alert notification module for reporting the filtered alert conditions.

According to another embodiment, a system for reporting an alert condition is disclosed. The system includes means for maintaining filter alert criteria, means for identifying one or more alert conditions, means for filtering the one or more identified alert conditions based on the alert filter criteria and means for reporting the filtered alert conditions.

According to another alternative embodiment, a computer-readable storage medium is disclosed. The medium is encoded with processing instructions for reporting an alert condition, including instructions for defining alert filter criteria and instructions for identifying an alert condition. The medium also includes computer readable instructions for analyzing one or more properties of the alert condition based on the alert filter criteria and for determining whether to report the alert condition. The medium further includes instructions for selectively reporting the alert condition.

BRIEF DESCRIPTION OF THE DRAWINGS

For a more complete understanding of the present methods and systems, reference is now made to the following description taken in conjunction with the accompanying drawings in which like reference numbers indicate like features and wherein.

DETAILED DESCRIPTION

Figure 1A:
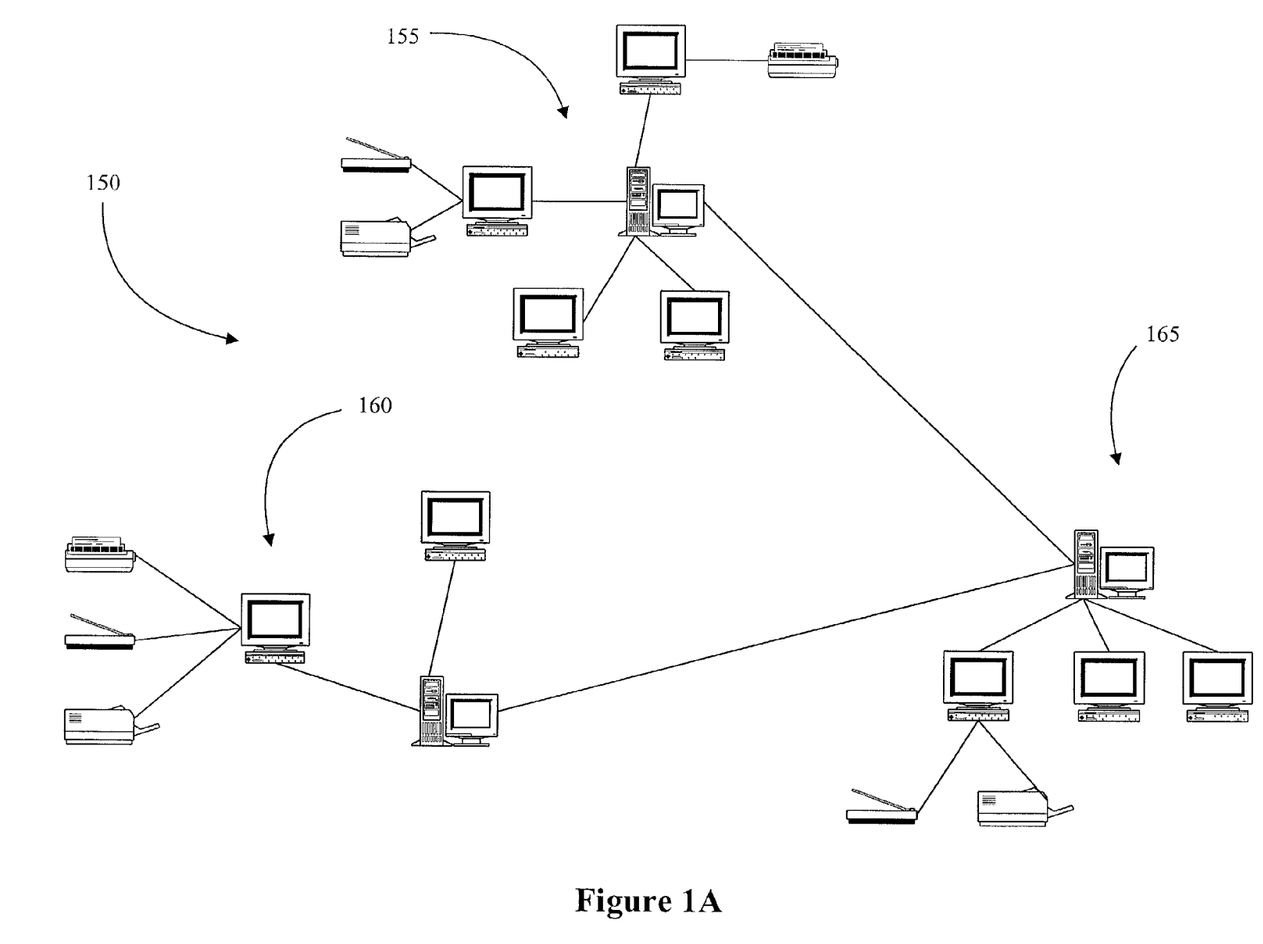
FIG. 1A illustrates an exemplary enterprise system.

An exemplary IT enterprise is illustrated in FIG. 1A. The IT enterprise 150 includes local area networks 155, 160 and 165. IT enterprise further includes a variety of hardware and software components, such as workstations, printers, scanners, routers, operating systems, applications, and application platforms, for example. Each component of IT enterprise may be monitored and managed in accordance with the present disclosure.

Figure 1B:
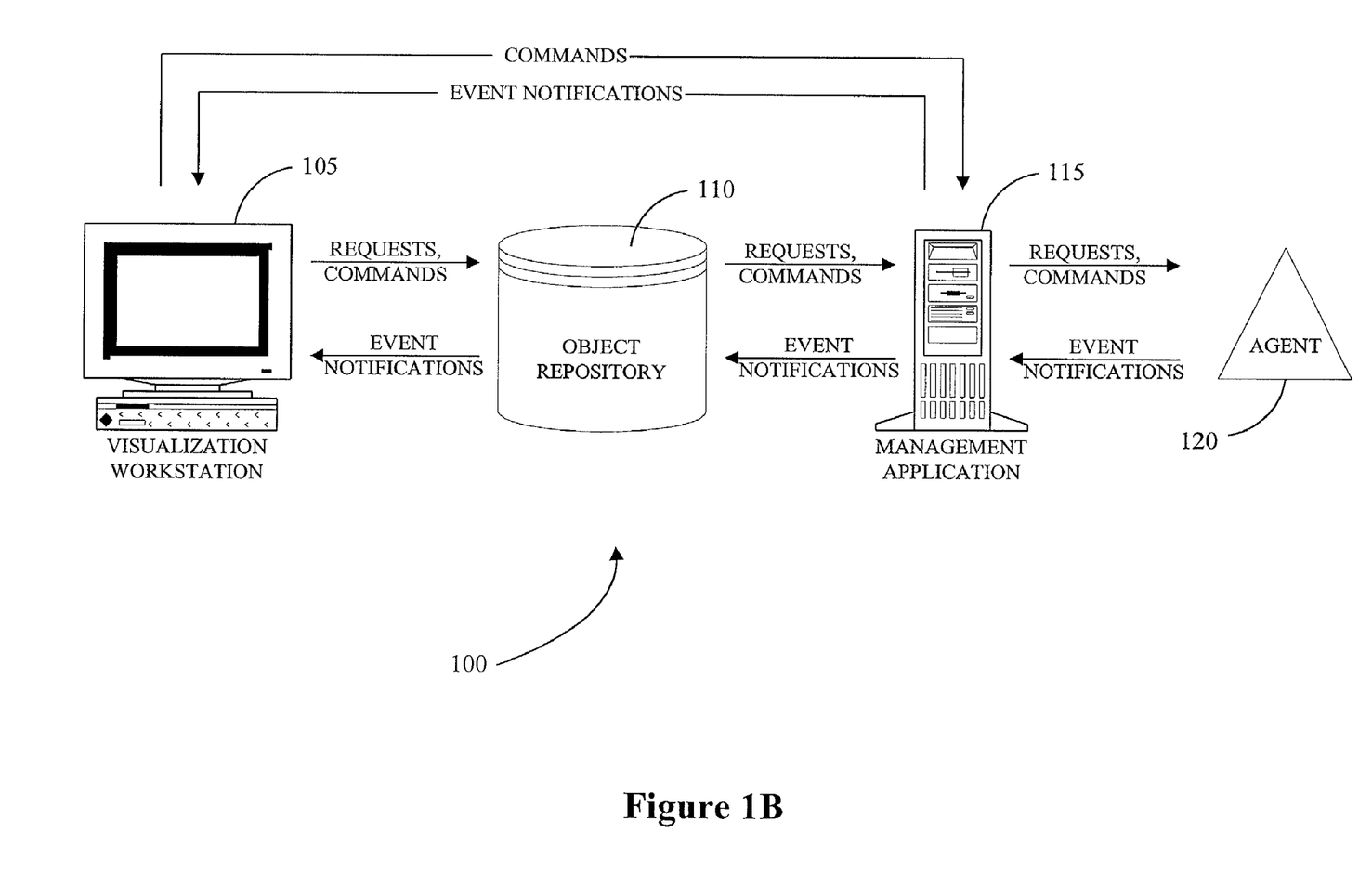
FIG. 1B illustrates an exemplary management system topology that may be managed in accordance with the disclosed methodology.

The various components of an exemplary management system 100 topology that can manage an IT enterprise in accordance with the present disclosure are shown in FIG. 1B. The management system 100 includes at least one visualization workstation 105, an object repository 110, one or more management applications 115, and one or more management agents 120 associated with each management application 115.

The visualization workstation 105 provides a user access to various applications including a network management application 115. Workstation 105 interacts with an object repository 110 which stores and delivers requests, commands and event notifications. Workstation 105 requests information from object repository 110, sends commands to the object repository, and gets notification of events, such as status changes or object additions from it. The object repository 110 receives request information from the management application 115, which is fed by the management agents 120 responsible for monitoring and managing certain components or systems in an IT enterprise.

The management application 115 maintains object repository 110, in part, to keep track of the objects under consideration. The object repository 110 may be a persistent store to hold information about managed components or systems, such as a database. In an alternative embodiment, the management application 115 and object repository 110 may be integrated into a single unit that can hold information about managed components in volatile memory and perform the tasks of the management application.

As shown, one architectural aspect of the present system is that in normal operation, the visualization workstation 105 interacts primarily with the object repository 110. This reduces network traffic, improves the performance of graphical rendering at the workstation, and reduces the need for interconnectivity between the visualization workstation 105 and a multitude of management applications 115, their subsystems and agents 120 existing in the IT enterprises. Of course, embodiments having other configurations of the illustrated components are contemplated, including a stand-alone embodiment in which the components comprise an integrated workstation.

In addition to handling requests, commands and notifications, object repository 110 may also handle objects describing the structure and operation of the management system 100. Such objects may describe the momentary state, load, and performance of the components and/or systems. Such objects may be populated using a manual process or an automatic discovery utility.

The alert filtering criteria may be, for example, the severity of an event, the relative importance of the object that exhibits the event, the urgency of the notification and the likelihood that the event condition will occur. To illustrate the interplay of severity, importance, urgency and risk, consider two potential problems associated with a personal computer and attached peripherals. The first potential problem might be an 80% likelihood that there will be a shortage of paper for the printer. The second potential problem might be a 2% likelihood that there will be a hard disk drive failure. The first problem has a high risk and low severity while the second potential problem has a relatively low risk but high severity. Determining the importance and urgency of each potential problem might require additional information regarding the use of the personal computer. For example, if a major use of a computer is printing, the urgency and importance the first problem might be higher. If the computer is primarily used for data storage, acting as a server for other computers running mission critical applications, the importance of the second problem might be higher, while the urgency might be moderate.

Figure 2:
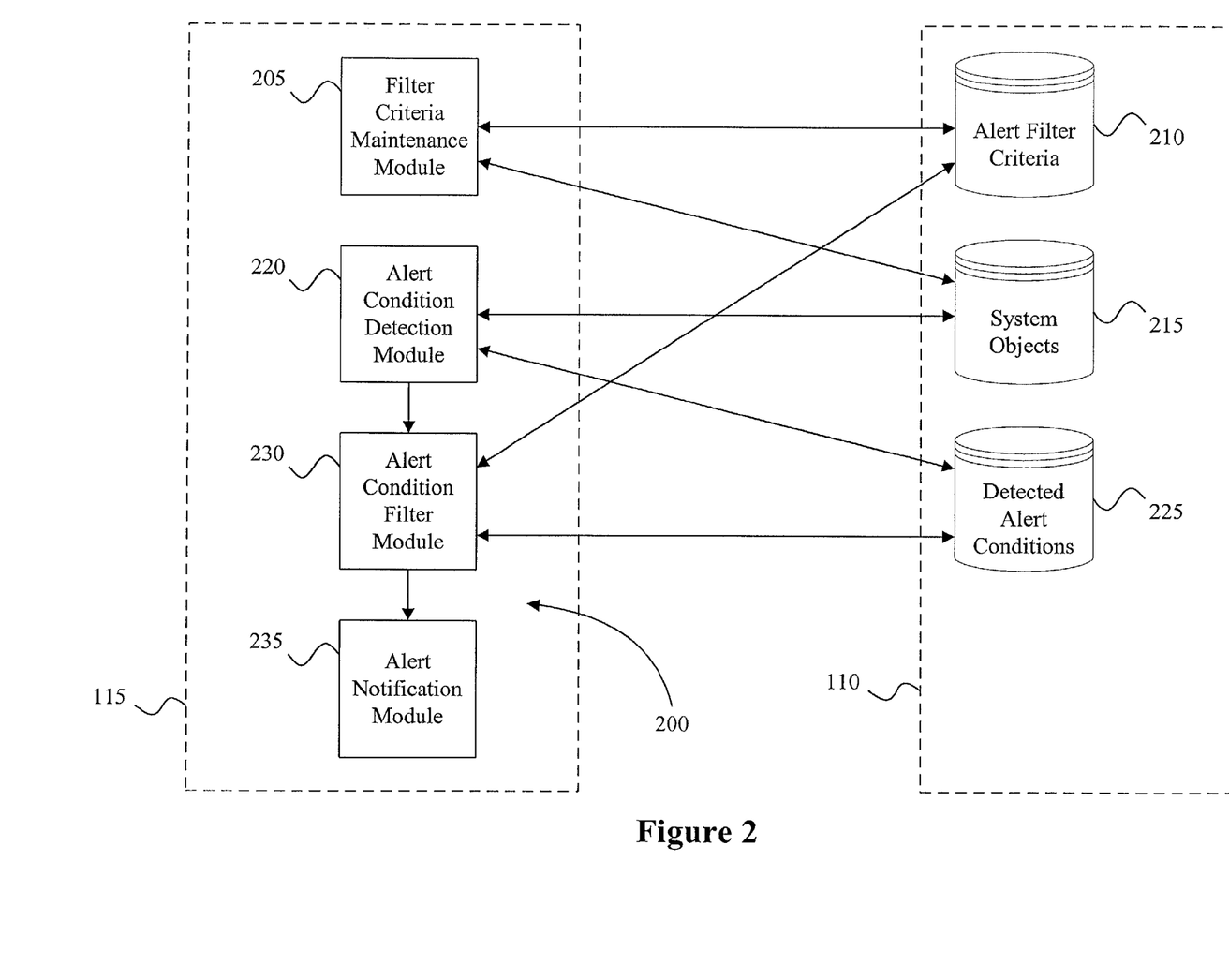
FIG. 2 is a block diagram illustrating exemplary components for implementing one embodiment of an alert system methodology according to the present disclosure.

Referring now to FIG. 2, components forming one embodiment of an alert system according to the present disclosure is shown. The alert system 200 may be a distributed system formed by, for example, management application 115 and object repository 110 shown in FIG. 1. Alternatively, as noted above, the management system 115 may incorporate the object repository 110 and the alert system 200 may be an integrated system incorporated into management application 115. In the embodiment of FIG. 2, the alert system 200 includes a filter criteria maintenance module 205, an alert condition detection module 220, an alert condition filter module 230, and an alert notification module 235. The filter criteria maintenance module 205 enables an operator to define criteria under which alert notifications may be reported. The alert filter criteria are stored in the object repository 110 as a set of alert filter criteria objects in database 210. The filter criteria maintenance module 205 may further enable an operator to add, delete, update or otherwise maintain system objects in database 215 that define the topology of IT enterprise 150. Maintenance of the system objects in database 215 may include, for example, defining the importance of a system or network component, or defining dependency or containment relationships between and among several system or network components.

According to one embodiment, the alert filter criteria objects in database 210 direct the alert system 200 how to react to an alert message based on both the severity of an alert condition and on the importance of the affect of the alert condition on system or network component(s). The alert filter criteria objects in database 210 may further direct the system to take the urgency of an alert condition into account, and in the case of a prediction, the alert system 200 may take into account the level of risk.

Because the alert system 200 enables tracking the importance of objects, the severity and urgency of alert conditions and the risk for predicted alert conditions, the alert system 200 can use any or all of these four metrics to filter and report alert messages or notifications intelligently.

Figure 3A:
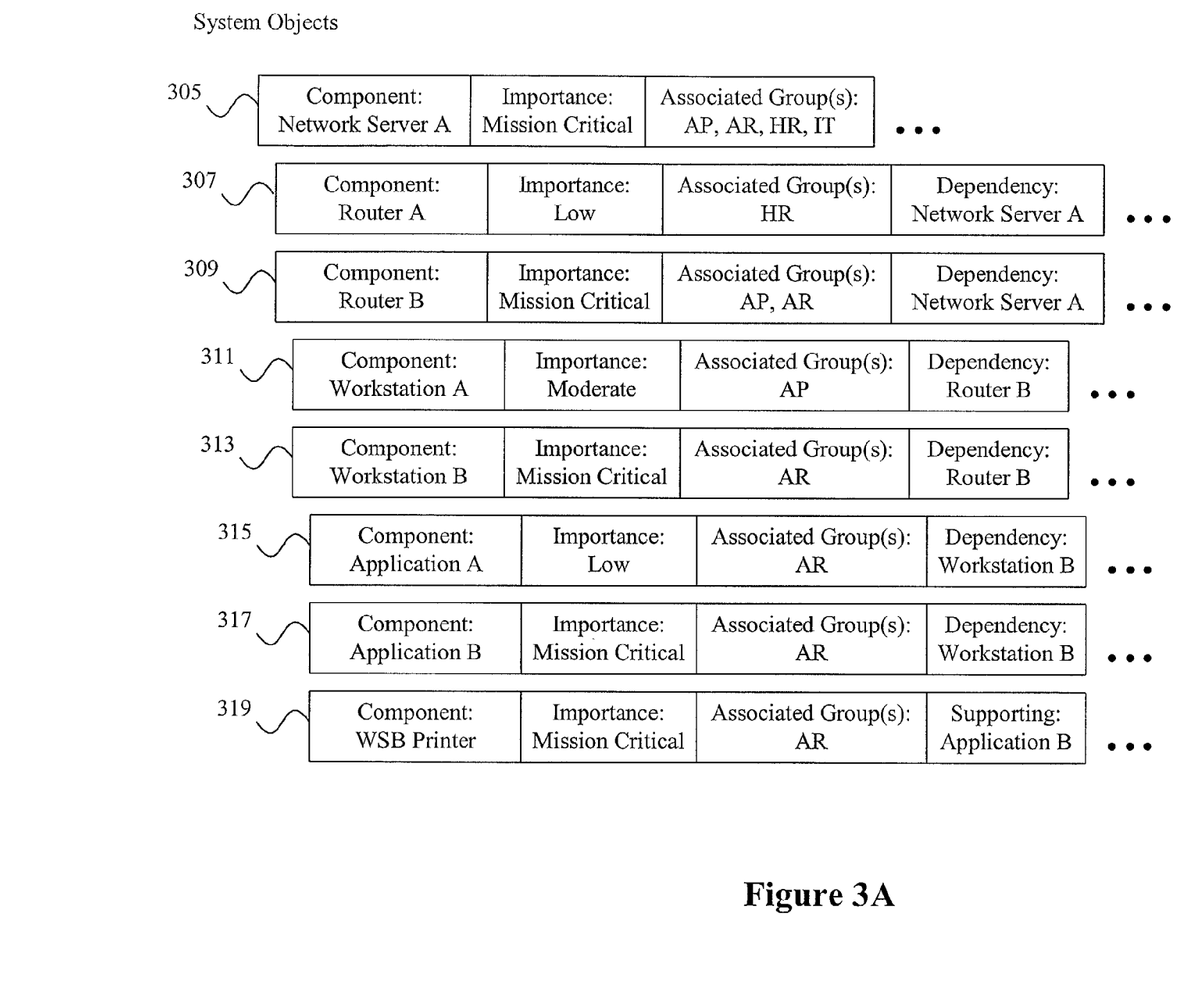
FIG. 3A is a diagram illustrating exemplary system topology objects used by one or more embodiments of the management system according to the present disclosure.

FIG. 3A illustrates portions of several exemplary system objects that may be maintained by, for example, filter criteria maintenance module 205. The illustrated objects relate to a topology of It enterprise 150. In this exemplary illustration, object 305 represents a "network server A" which utilizes "router A" and "router B", represented by objects 307 and 309 respectively, to communicate with other network components. For example, "network server A" utilizes "router B" to communicate with "workstation A" and workstation B", represented by objects 311 and 313 respectively. Workstation B is running two applications represented by objects 315 and 317, and "workstation B" has an associated printer "WSB printer" represented by object 319.

The alert system according to the present disclosure can use the level of importance of each object to facilitate context-based filtering. Instances may occur where the importance of an alert condition is not readily apparent from the object. For example, a database server may not always be mission-critical, and it may depend on whether the database server is being used by an application having an importance level of mission critical. Of course, human operators may know how the database server is being used and can manually enter the appropriate levels of importance for a particular server. Manual entry of importance levels, however, is cumbersome and inefficient, especially in situations where the relationships between different components may be indirect. For example, a database server may be shifted from a moderate level of importance to a mission critical level of importance. If the shift is not detected by the operator, the old lower importance level may inadvertently be retained. Another example of the inefficiency of manual entry of importance level can occur is where the traffic between an application running on a workstation and a database server depends on other network components, e.g., routers. In such situations, the database server, other network components, and the human operator may not be aware of such indirect relationships and consequently may neglect to manually adjust the importance levels.

Thus, according to one embodiment of the present system, if the management system can detect such dependency relationships, the importance rating can be influenced by dependencies.

The objects illustrated in FIG. 3A illustrate an example of such inheritance of importance properties based on a dependency relationship. As shown, Application B 317 is a mission critical application so that workstation B 313, the workstation upon which successful execution of the mission critical application depends, also assumes an importance level of "mission critical". Further, the router 309 and the network server 305, upon which the application depends, are also assigned "mission critical" importance. As a result, the alert system 200 can support the use of dependency relationships to propagate or inherit importance levels.

Figure 3B:
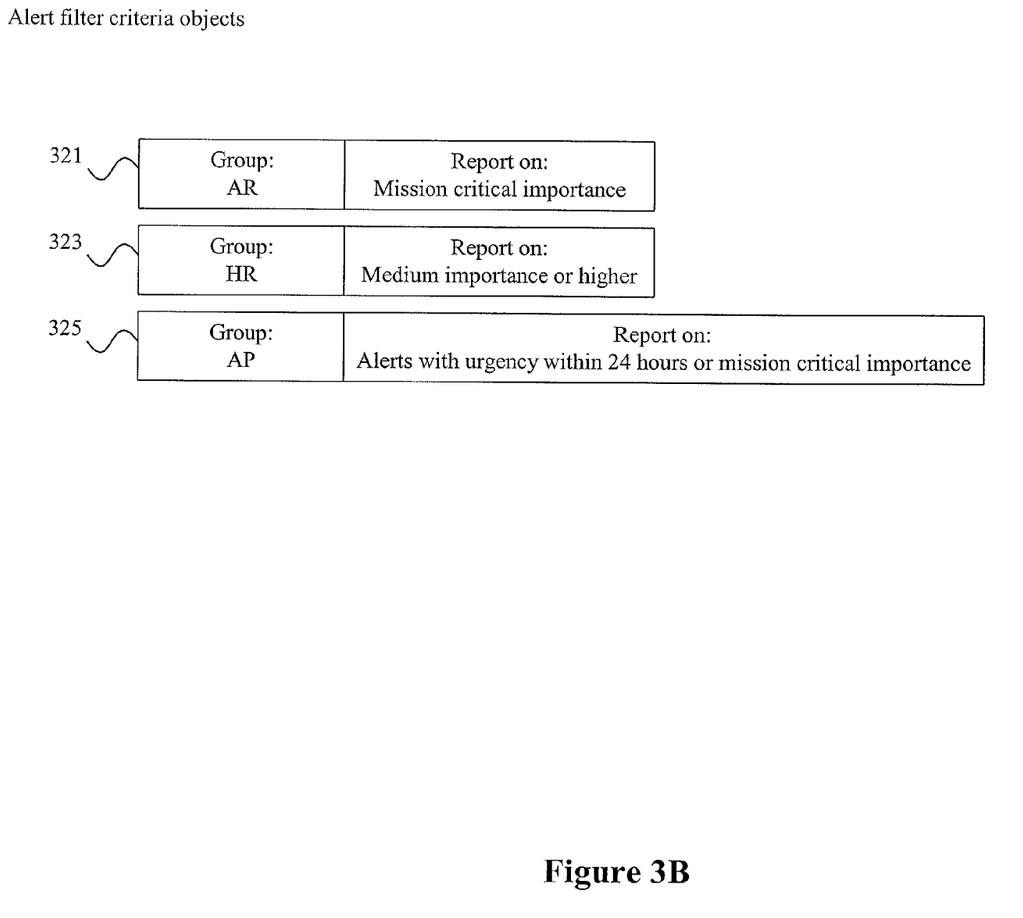
FIG. 3B is a diagram illustrating exemplary alert filter criteria objects used by one or more embodiments of the management system according to the present disclosure.

FIG. 3B illustrates several exemplary alert filter criteria objects that may be maintained by filter criteria maintenance module 205, and used by the alert system 200 to determine whether or not to report an alert condition to an operator. In this exemplary embodiment, each alert filter criteria is assigned a group ID which designates a system component subject to an alert condition. Although the objects of FIG. 3B are indexed by group, alternate indexing schemes, such as by operator ID or workstation ID, for example, may also be used.

In the exemplary embodiment of FIG. 3B, alert filter criteria object 321 represents a filter rule associated with alerts affecting an accounts receivable business group having a group ID "AR". Alert filter criteria object 321 directs the alert system 200 to report alerts affecting an AR function only if the alert has an importance level of "mission critical". Alert filter criteria object 323 represents a filter rule associated with alerts affecting a human resources business division having a group ID "HR". Alert filter criteria object 323 directs the system to report alerts affecting an HR function only if the alert has an importance level of "medium or higher."

Alert filter criteria object 325 represents a filter rule associated with alerts affecting an accounts payable business division having a group ID "AP". Alert filter criteria object 325 directs the system to report alerts affecting an AP function only if the alert has an importance level of "mission critical" or if the alert has an urgency level of 24 hours or less.

Referring again to FIG. 2, the alert condition detection module 220 is used to detect actual or potential alert conditions. Alert condition detection module 220 refers to the system objects in database 215 of object repository 110 among other relevant factors to determine whether an alert condition exists, and generates and stores an alert condition object in database 225.

In one embodiment, alert condition detection module 220 assigns a severity property to each detected alert condition. This may be accomplished using the principles of the predictive management system described in commonly owned U.S. Pat. No. 6,327,550, which is incorporated herein by reference. Risk and urgency properties are also assigned. The urgency property may represent the amount of time remaining before action must be taken or it may represent a rating inversely related to the amount of time remaining. As previously described, module 220 also assigns an importance property to the alert condition object. The importance property represents a measure of the importance of the object, indicated, for example, along some suitable scale, such as 0-5.

The importance property may be determined in any of a number of ways. For example, the importance property may be manually assigned to each class of objects, so that each object of that class inherits the importance property of the class. Alternatively, classes of objects may be arranged in an inheritance hierarchy, so that a subclass (such as "NT server") may inherit the importance rating of its parent class (such as "NT system"). In accordance with another example of importance level assignment, individual objects may be manually assigned an importance rating that overrides the rating of the class.

According to another way that the importance property may be assigned, various subsystems, such as for example a job scheduling system, may automatically set the importance properties of individual objects based on some suitable determination, overriding the rating of the class. In yet another example, the importance property may be propagated up a containment hierarchy based on some suitable algorithm. For example, importance may be propagated up based on the highest value among the contained components, so a component that contains several sub-components assumes the highest importance rating of the sub-components it contains.

The importance property may also be propagated along dependency relationships based on some suitable algorithm. For example, the importance property may be propagated along a "depends on" direction of a relationship with a "largest-value" aggregation function, so if an important application server depends on a database server, then the database server gets the same importance property as the application server unless some other propagation gives it a higher rating.

The detected alert condition objects of database 225 are referenced by alert condition filter module 230 and analyzed in accordance with the applicable alert filter criteria from database 210 to determine whether the detected alert condition qualifies to be reported to an operator. If alert condition filter module 230 determines that a detected alert condition merits reporting, the alert notification module 235 is directed to report the alert notification to an appropriate operator.

Figure 3C:
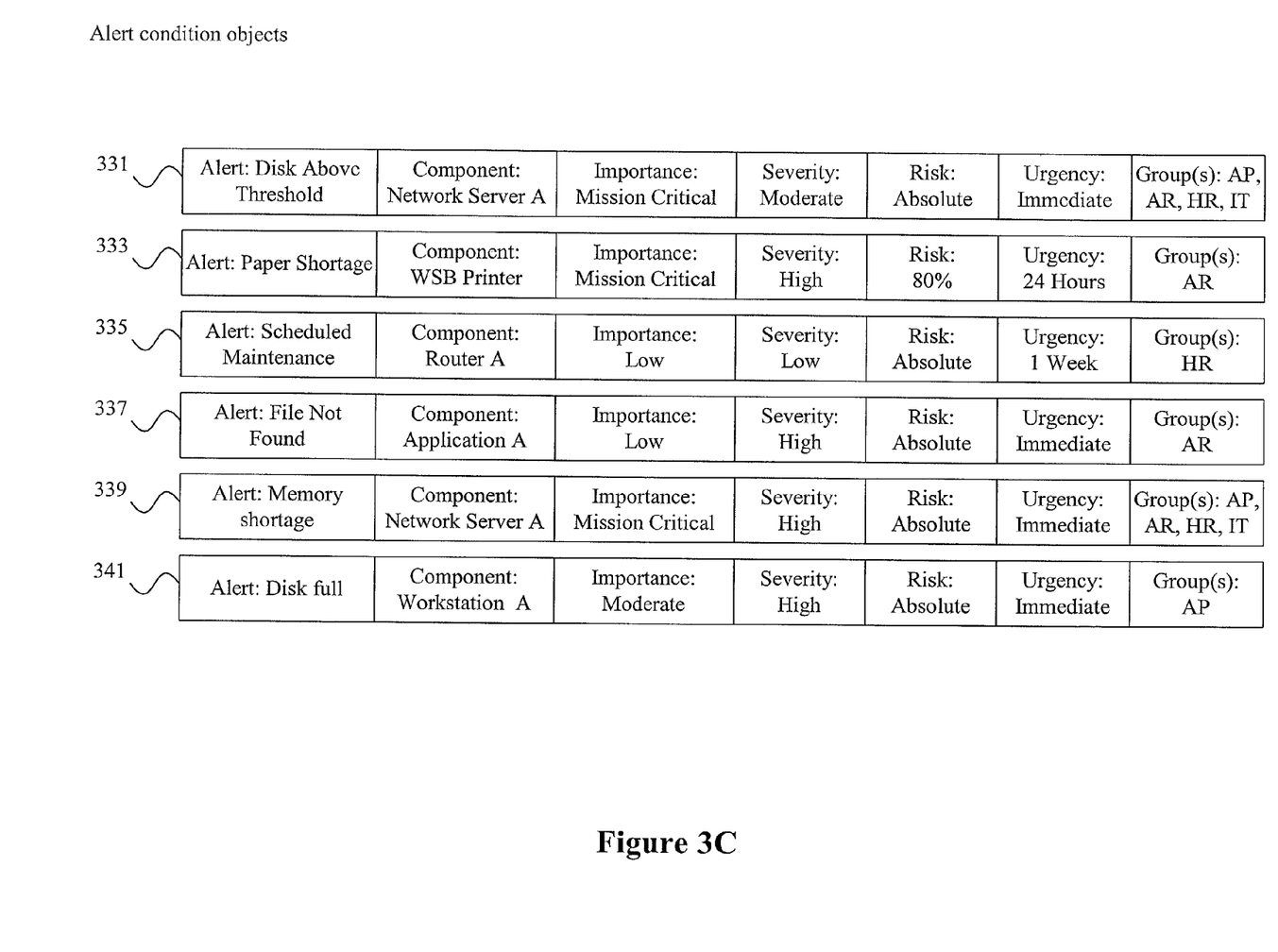
FIG. 3C is a diagram illustrating exemplary alert condition objects used by one or more embodiments of the management system according to the present disclosure.

FIG. 3C illustrates several exemplary alert condition objects which may be generated by alert condition detection module 220. Each illustrated alert condition object represents an actual or projected alert condition that may be reported to an operator by alert notification module 235 based on the alert filter criteria 210.

Referring to FIGS. 3A and 3C, alert condition object 331 is an example of an actual alert condition. Object 331 represents an alert condition in which the used disk space associated with network server A has exceeded a predetermined acceptable threshold. The importance level of the alert is "mission critical" because network server A 305 supports the mission critical application 317 running on workstation B 313. Alert condition detection module 220 determined the severity to be moderate, due to the fact that there is still available storage space on the disk, and further determined the risk to be "absolute" because the condition exists. Alert detection module 220 also determined that the urgency for this alert is immediate. Due to the relationship of network server A to the other components in the system, the affected groups include AP, AR, HR and IT.

Alert condition object 333 is an example of a potential or projected alert condition. Object 333 represents an alert condition in which there is a potential paper shortage for WSB printer. The importance level of the alert is "mission critical" because WSB printer 319 is used by the mission critical application 317 running on workstation B 313. Alert condition detection module 220 determined the severity to be high, due to the fact that while there is still available paper, the lack of paper would prevent the proper completion of Application B. Alert condition detection module 220 also determined that the likelihood that the condition will occur is 80% and that the urgency for this alert is "24 hours". Due to the relationship of the WSB printer to the other components in the system. The group AR the is the only affected group.

As discussed above, the importance level of an object may be propagated along dependency relationships. The alert condition objects of FIG. 3C illustrate that in one embodiment, the importance levels, severity, risk and urgency may be propagated among objects may also be propagated along containment relationships. In other words, so a computer or other component that hosts or provides service to an important process is also important, as is the subnetwork within which the computer resides.

Of course, the use of severity and importance properties for filtering messages requires some care, when properties are propagated. Although the importance and severity properties illustrated herein have been qualitative, in an alternative embodiments such properties could be quantitative, e.g. numerical.

In such an embodiment, filter criteria maintenance module 205 may support filter criteria, and alert condition filter module 230 could filter alert condition objects, based on the sum or product of the numerical values representing severity and importance levels. As an example, consider a situation in which sub-network S1 contains computers C1 and C2. In this example, computer C1 is performing an important function and has a "very high" importancelevel, but a "normal" severity level. Computer C2 is a test system and has a "critical" severity level, but a "low" importancelevel. If severity and importance are independently propagated, then the subnetwork S1 would have both the "critical" severity and the "very high" importance levels, which might lead the message filtering system to report an alert for sub-network S1. However, if the important computer C1 is functioning properly, and the unimportant test computer C2 exhibits problems, there is no cause for concern regarding sub-network S1 and notification of the alert may not be needed. Therefore, according to an alternative embodiment of the present alert system, a filtering expression, such as, for example "severity+importance", can be propagated separately so that alerts are reported for those alerts that meet this sum or difference filtering condition.

Figure 4:
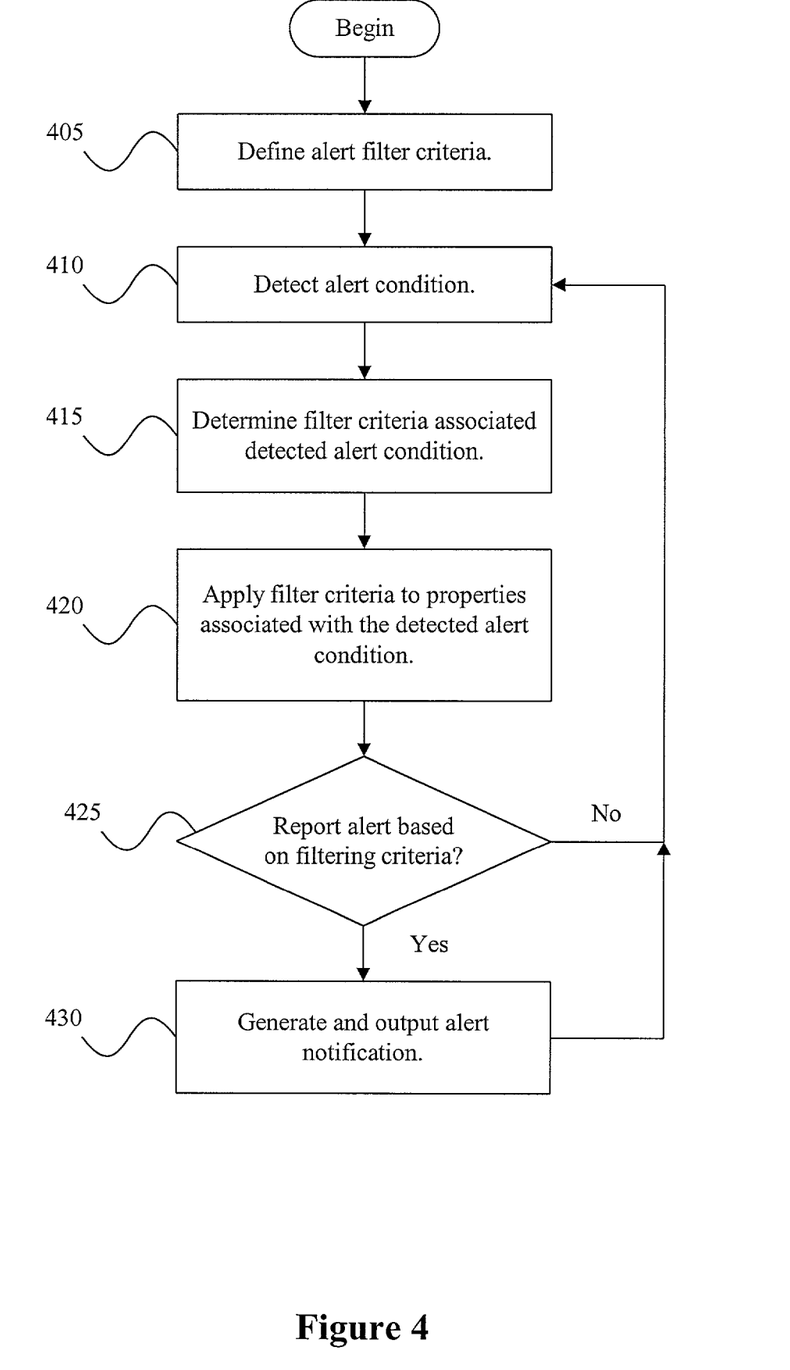
FIG. 4 is an exemplary flow diagram of one method for filtering alert conditions in accordance with one embodiment of the present disclosure.

Referring now to FIG. 4, there is illustrated an exemplary flow diagram of methodology for filtering alert conditions in accordance with one embodiment of thepresent disclosure. At block 405, alert filter criteria are defined. The filter criteria are utilized to determine whether to report a detected filter condition, and they may include importance, severity, urgency and/or risk properties. The filter criteria may further include one or more identifiers representing a user, a workstation, an interest group or a business process.

At block 410, an alert condition is detected. The alert condition may be an existing condition that requires operator attention, a warning regarding an existing condition or a predicted/potential condition that may require operator attention. Any technique known to those of skill in the art may be used in the detection of actual or potential alert conditions.

In addition to the detection of an alert condition, block 410 may also include use propagation algorithms to determine certain properties of the alert condition as represented by an alert condition object, such as for example, importance, severity, urgency and/or risk. In addition, associated identifiers such as, for example, an interest group identifier, may also be propagated to the alert condition object. The propagation may occur, for example, along dependency relationships or along containment relationships.

At block 415, the filter criteria associated with the detected alert condition are determined. The association between the filter criteria and the detected alert condition may be based on one or more elements such as, for example, interest group identifier, user identifier or, system component identifier. The association may be based on any factor that would be relevant in reporting the detected alert condition.

At block 420, the filter criteria is applied to the relevant properties of the detected alert condition. Based on the application of the filter criteria to the detected alert condition, a determination is made at block 425 whether or not to report the detected alert condition. If the properties of the detected alert condition fall within the alert filtering criteria, an alert notification is generated and output to an appropriate operator at block 430. Otherwise, the detection and filtering steps are repeated to continually report alert conditions as they arise.

Accordingly, it is to be understood that the drawings and description in this disclosure are proffered to facilitate comprehension of the methods and systems, and should not be construed to limit the scope thereof It should be understood that various changes, substitutions and alterations can be made without departing from the spirit and scope of the disclosed methods systems.

What is claimed is:

1. A method for reporting an alert condition, comprising:
defining alert filter criteria, wherein a particular alert filter criterion is associated with one or more of a plurality of interest group identifiers;
identifying an alert condition;
determining an urgency level, a severity level, and at least one interest group identifier associated with the alert condition;
identifying at least one alert filter criterion associated with the at least one determined interest group identifier;
determining whether the alert condition satisfies the at least one identified alert filter criterion, the determination based at least in part on the urgency level or the severity level; and
if the alert condition satisfies the at least one identified alert filter criterion, reporting the alert condition.

2. The method of claim 1, further comprising:
determining an importance level associated with the alert condition, wherein the determination of whether the alert condition satisfies the at least one identified alert filter criterion is based at least in part on the importance level.

3. The method of claim 1, wherein identifying an alert condition comprises identifying a potential alert condition.

4. The method of claim 1, further comprising determining a level of risk associated with the alert condition, wherein the determination of whether the alert condition satisfies the at least one identified alert filter criterion is based at least in part on the level of risk.

5. The method of claim 1, wherein:
the alert condition is associated with a first object;
a second object depends upon the first object, the second object associated with a particular severity level; and
the determination of the severity level associated with the alert condition is based at least in part on the particular severity level associated with the second object.

6. The method of claim 1, wherein identifying an alert condition comprises:
identifying a first object representing a first system component associated with the alert condition;
identifying a second object representing a second system component having a dependency relationship to the first system component; and
propagating a property of the second object to the first object.

7. The method of claim 1, wherein identifying an alert condition comprises:
identifying a first object representing a first system component associated with the alert condition;
identifying a second object representing a second system component having a containment relationship to the first system component; and
propagating a property of the first object to the second object.

8. A system for reporting an alert condition, comprising:
a filter criteria maintenance module operable to maintain alert filter criteria, wherein a particular alert filter criterion is associated with one or more of a plurality of interest group identifiers;
an alert condition detector operable to:
identify at least one alert condition; and
determine an urgency level, a severity level, and at least one interest group identifier associated with the at least one alert condition;
an alert condition filter operable to:
identify at least one alert filter criterion associated with the at least one interest group identifier; and
determine whether the at least one alert condition satisfies the at least one identified alert filter criterion, the determination based at least in part on the urgency level or the severity level;
and
an alert notification module that is operable to report the at least one alert condition if the at least one alert condition satisfies the at least one identified alert filter criterion.

9. The system of claim 8, wherein:
the alert condition detector is further operable to determine an importance level associated with the at least one alert condition; and
the determination of whether the at least one alert condition satisfies the at least one identified alert filter criterion is based at least in part on the importance level.

10. The system of claim 8, wherein the alert detector identifies a potential alert condition.

11. The system of claim 8, wherein the alert condition detector is further operable to determine a level of risk associated with a potential alert condition.

12. The system of claim 8, wherein:
the at least one alert condition is associated with a first object;
a second object depends upon the first object, the second object associated with a particular severity level; and
the determination of the severity level associated with the at least one alert condition is based at least in part on the particular severity level associated with the second object.

13. The system of claim 8, wherein the alert condition filter comprises property propagation logic for propagating a property of a first object to a property of a second object based on a dependency relationship between the first and second objects.

14. The system of claim 8, wherein the alert condition filter comprises property propagation logic for propagating a property of a first object to a property of a second object based on a containment relationship between the first and second objects.

15. A system for reporting an alert condition, comprising:
means for maintaining alert filter criteria, wherein a particular alert filter criterion is associated with one or more of a plurality of interest group identifiers;
means for identifying at least one alert condition and determining an urgency level, a severity level, and at least one interest group identifier associated with the at least one alert condition;
means for identifying at least one alert filter criterion associated with the at least one determined interest group identifier and determining whether the at least one alert condition satisfies the identified alert filter criterion;

and means for reporting the at least one alert condition if the at least one alert condition satisfies the at least one identified alert filter criterion.

16. Logic embodied in a computer readable medium, the logic operable, when executed, to:

define alert filter criteria, wherein a particular alert filter criterion is associated with one or more of a plurality of interest group identifiers;

identify an alert condition;

determine an urgency level, a severity level, and at least one interest group identifier associated with the alert condition;

identify at least one alert filter criterion associated with the at least one determined interest group identifier;

determine whether the alert condition satisfies the at least one identified alert filter criterion, the determination based at least in part on the urgency level or the severity level; and if the alert condition satisfies the at least one identified alert filter criterion, report the alert condition.

17. A method for reporting an alert condition, comprising:

defining alert filter criteria, wherein a particular alert filter criterion is associated with one or more of a plurality of interest group identifiers;

identifying an alert condition;

determining an importance level, a severity level, and at least one interest group identifier associated with the alert condition;

identifying at least one alert filter criterion associated with the at least one determined interest group identifier;

determining whether the alert condition satisfies the at least one identified alert filter criterion, the determination based at least in part on the importance level or the severity level; and if the alert condition satisfies the at least one identified alert filter criterion, reporting the alert condition.

18. The method of claim 17, further comprising:

determining an urgency level associated with the alert condition, wherein the determination of whether the alert condition satisfies the at least one identified alert filter criterion is based at least in part on the urgency level.

19. The method of claim 17, further comprising:

determining a level of risk associated with the alert condition, wherein the determination of whether the alert condition satisfies the at least one identified alert filter criterion is based at least in part on the level of risk.

* * * * *